United States Patent Office 3,813,421
Patented May 28, 1974

3,813,421
USE OF EPOXIDES IN THE PREPARATION OF HIGHER FATTY ACID ANHYDRIDES
John B. McKelvey and Ruth R. Benerito, New Orleans, La., assignors to the United States of America as represented by the Secretary of Agriculture
No Drawing. Filed Mar. 5, 1973, Ser. No. 337,791
Int. Cl. C07c 53/00, 57/00; C08h 9/00
U.S. Cl. 260—398                                       1 Claim

ABSTRACT OF THE DISCLOSURE

This invention relates to a process for the preparation of higher fatty acid anhydrides. More particularly, this invention relates to the use of epoxides in preparation of higher fatty acid anhydrides.

A non-exclusive, irrevocable, royalty-free license in the invention herein described, throughout the world for all purposes of the United States Government, with the power to grant sublicenses for such purposes, is hereby granted to the Government of the United States of America.

A number of general procedures are known for the production of acid anhydrides. The first and oldest method consists of treating an alkali metal or silver salt of an acid with the acid chloride of the same carboxylic acid; or if mixed anhydrides are desired, a different carboxylic acid chloride (or salt of a different acid) is used. Thus

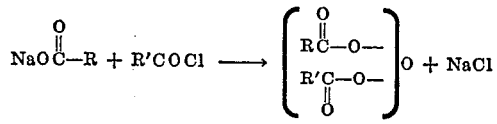

where the chain length of R and R' may be the same, or different.

A second method consists of the addition of an acid chloride to pyridine in a solvent such as benzene or excess pyridine. A carboxylic acid is then added dropwise and the pyridine hydrochloride formed is filtered off. The filtrate is concentrated and fractionated at reduced pressure. A variant of this method consists of pouring the pyridine-acid chloride complex formed in excess pyridine over cracked ice and HCl followed by methanol and benzene washing [C. F. H. Allen et al., Org. Syn. 26, 1 (1946)]. The yields are reported to be high and the method can be used for mixed anhydrides.

G. G. Youngs [J. Am. Oil Chem. Soc. 35, 416 (1958)] has shown that if a higher fatty acid and its chloride are to be reacted it is best to hold a vacuum (2 mm.) over the hot reactants (100° C.). He likewise reports higher yields of anhydrides but with a 0.9–1.5% yields of F.F.A. content.

In Sonntag's method of preparing anhydrides by heating acetic acid anhydride with an acid chloride (or acid anhydride) [N. O. V. Sonntag et al., J. Am. Oil Chem. Soc. 31, 151 (1954)] (ester exchange) followed by fractional distillation, high yields of many varied anhydrides were obtained. In this work the authors discuss attempts especially the addition of lauryl chloride and lauric acid in pyridine-benzene solvent. Much lower yields however are reported than by the ester exchange method or Adkin's method with pyridine [J. Am. Chem. Soc. 11, 2242 (1949)].

The present method was discovered when the chance observation was made in repeating and modifying the experiments of Whitby (J. Chem. Soc. 1926, 1462). Whitby was attempting to prepare the palmitic ester of 1,3-dichloropropanol-2 by heating epichlorohydrin with palmitoyl chloride is sealed tubes. We found that if the reaction was run in dioxane solution at room temperature for a few days, a small yield of palmitic anhydride was obtained. Although reagent grade chemicals were used—the dioxane-epichlorohydrin contained only traces of water—the reaction nevertheless occurred. It was reasoned that if water were added to the mixture in an amount so that half the acid chloride were hydrolyzed one should obtain good yields of the anhydride and if more than this optimum amount of the added water were used a lowered yield would result. This has been confirmed experimentally.

Furthermore, it was believed that the epichlorohydrin acts as an instant scavenger for the hydrochloric acid, and forms no adduct with the acid chloride under these conditions as does pyridine. It would appear from Youngs' experiments that an equilibrium between the acid chloride and acid is set up and the dissolved HCl formed thus forces the reaction too much to the left to give high yields of the anhydride.

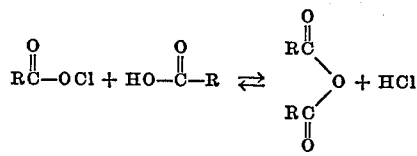

Epichlorohydrin avidly accepts HCl to form 1,3-dichloropropanol-2 thus drawing the equilibrium to the right. This hypothesis has also been tested by reacting a mixture of stearic acid and stearoyl chloride, or acetic acid and stearoyl chloride in the presence of excess epichlorohydrin at room temperature in dioxane or tetrahydrofuran. The latter solvent is preferred on account of its long liquid range and its lower freezing point. Stearic anhydride can be formed in over 90% yield when the epichlorohydrin is present. The reaction solvent (dioxane) was gelled in a matter of a few hours and the flat plates of the anhydride are readily filtered off. If no epichlorohydrin were present, the mixture of stearoyl chloride and stearic acid required more than two weeks to form the anhydride platelets. The liquid did not become a solid gel as previously when epichlorohydrin was present.

EXAMPLE 1

To 0.20 g. mole (54.9 g.) of palmitoyl chloride in 100 ml. of dioxane (0.02% $H_2O$) was added 0.2 g. mole (18.5 g.) epichlorhydrin. At the end of 30 days standing a 16.9% yield of palmitic anhydride was collected. Mica-like crystalline plates. M.P. 63° C. neutralization equivalent 220.

Analysis

| Percent calc. of $C_{32}H_{12}O_6$: | Percent found |
| --- | --- |
| C=77.85 | 77.60 |
| H=12.57 | 12.53 |
| Cl=0 | 0 |

NMR spectra of the compound in $DCCl_3$ gave the following chemical shifts:

In p.p.m. downfield from tetramethyl silane (TMS) used as an internal standard: 0.89, 1.28, 2.33. Ratios of integrated areas of these peaks characteristic of a terminal methyl, methylene groups, and a methylene α to a carbonyl respectively were 3/26/2.

EXAMPLE 2

Essentially the same as Example 1 except that the water content was 1.8 g./100 ml. dioxane. In 0.7 day a yield of 65.6% was obtained. If allowed to stand for a week, the yield increased to 71.7%.

EXAMPLE 3

Essentially the same as Example 2 except that the epichlorohydrin was omitted. In 5.5 hours the clear reaction mixture became turbid and overnight a very small amount of crystals were visible (0.1 g. obtained on recrystallization). This should not be surprising in view of the same slow occurrence in Example 6b.

The mother liquor reeked of HCl. When the required amount of epichlorohydrin was added at this point, a 61.3% yield of anhydride was obtained in a five-hour reaction time.

EXAMPLE 4

Essentially the same as Example 2 except that 2.4 g. of water was added. A yield of only 41.5% anhydride was obtained showing that if more than one equivalent of water is added the yield is diminished.

EXAMPLE 5

Lauric anhydride

One mole of lauroyl Cl (218.9 g.) was added to 370 ml. of tetrahydrofuran. One more of epichlorohydrin (82.5 g.) was also added. The reaction mixture was held at room temperature in a water bath and 0.5 mole water (9.0 g.) was slowly added with stirring. No heating resulted. The platelets were filtered from the solvent, the THF reduced in volume, and finally the THF was replaced by low boiling ligroin in which the product is less soluble. Weight of various crystal crops=30.9 g., yield 68.3%. M.P. 42°. Dioxane is a better solvent for the shorter chain anhydrides, hence THF and low boiling ligroin (30-60° C.) were used. [In regard to solubility of unsaturated anhydrides such as oleic no solvent was found from which the anhydrides would precipitate although the reaction occurred as usual.]

EXAMPLE 6

Stearic anhydride (a) Essentially by same method as Example 1. Yield 83%, M.P. 71° C.

(b) To 0.1 mole of stearoyl chloride dissolved in 100 ml. dioxane, 0.1 mole of powdered stearic acid was added. Epichlorohydrin 0.2 mole was also added. Stearic acid is soluble in dioxane at 85° C. to the extent of 0.85 g. in 100 ml. dioxane. In two hours the suspension in dioxane had solidified and 130 ml. more dioxane were added. This likewise solidified and was allowed to stand overnight. The solids were filtered off and the filtrate worked up so that two more crops of platelets were obtained. In all 52.3 g. or 94.1% yield was obtained.

(c) When stearoyl chloride (0.1 mole) and stearic acid (0.1 mole) were mixed with 100 ml. of dioxane in a stoppered flask, no visible action (gel formation) took place until about 1 week had elapsed and even after 2 weeks the contents of the flask had not solidified. At all times the flask reeked of hydrochloric acid. Some platelets formed in about a week.

EXAMPLE 7

Mixed anhydrides—aceto-stearic anhydride

To 0.1 mole of glacial acetic acid (6 g.) in 100 ml. of dioxane was added 0.1 mole of stearoyl Cl along with 0.2 mole of epichlorohydrin. After standing overnight the gel formed was filtered and the volume reduced. A 66% yield of the anhydride (21.55 g.) was obtained. M.P. 67–68° C. This procedure offers considerable advantage over the conventional potassium acetate-stearoyl Cl method in that the filtrations are much less difficult and platelets were obtained at once.

We claim:

1. A process for the preparation of fatty acid anhydrides in which one alkyl group has at least 12 carbons which process comprises:
   (a) reacting one part of an acid chloride selected from the group consisting of palmitoyl chloride, lauroyl chloride, and stearoyl chloride with one part of an epoxide and 0.5 parts water in dioxane,
   (b) filtering the reaction mixture from (a) to obtain the acid anhydride.

References Cited

UNITED STATES PATENTS 3,242,200  3/1966  Johnson _____ 260—398

OTHER REFERENCES

Chemical Abstracts (1971), Vol. 74, p. 434, par. 125, 208h.

ELBERT L. ROBERTS, Primary Examiner

U.S. Cl. X.R.

260—546